(12) United States Patent
Wang et al.

(10) Patent No.: US 11,921,345 B2
(45) Date of Patent: Mar. 5, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Chao-Chang Hu, Taoyuan (TW); Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 192 days.

(21) Appl. No.: 17/383,742

(22) Filed: Jul. 23, 2021

(65) Prior Publication Data

US 2022/0026665 A1 Jan. 27, 2022

Related U.S. Application Data

(60) Provisional application No. 63/056,183, filed on Jul. 24, 2020.

(51) Int. Cl.
| | |
|---|---|
| *G02B 7/09* | (2021.01) |
| *G02B 7/02* | (2021.01) |
| *G02B 7/08* | (2021.01) |
| *G02B 13/00* | (2006.01) |
| *G02B 27/64* | (2006.01) |
| *G03B 5/02* | (2021.01) |

(52) U.S. Cl.
CPC .............. *G02B 7/09* (2013.01); *G02B 7/023* (2013.01); *G02B 7/025* (2013.01); *G02B 7/026* (2013.01); *G02B 7/08* (2013.01); *G02B 13/0065* (2013.01); *G02B 27/646* (2013.01); *G03B 5/02* (2013.01); *G03B 2205/0053* (2013.01)

(58) Field of Classification Search
CPC .......... G02B 7/09; G02B 7/023; G02B 7/025; G02B 7/026; G02B 7/08; G02B 7/021; G02B 7/005; G02B 7/04; G02B 7/10; G02B 27/64; G02B 27/646; G02B 13/001; G02B 13/0055; G02B 13/0065; G02B 13/009; G03B 5/00; G03B 5/02; G03B 13/34; G03B 13/36; G03B 13/32; G03B 2205/0069; G03B 2205/0053; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC .............. 359/822, 823, 824, 694, 696, 813; 396/89
See application file for complete search history.

(56) References Cited

U.S. PATENT DOCUMENTS

2007/0217775 A1* 9/2007 Shirono ................. H04N 23/55
  348/E5.025
2019/0271825 A1* 9/2019 Kawanabe ............. G02B 7/023
(Continued)

*Primary Examiner* — Marin Pichler
(74) *Attorney, Agent, or Firm* — Muncy, Geissler, Olds & Lowe, P.C.

(57) ABSTRACT

An optical element driving mechanism is provided in the present disclosure. The optical element driving mechanism includes a fixed portion and a movable portion. The movable portion moves relative to the fixed portion. The movable portion includes a first movable assembly and a second movable assembly. The first movable assembly is connected to a first optical element. The second movable assembly is connected to a second optical element. The first movable assembly and the second movable assembly are movable relative to each other.

19 Claims, 10 Drawing Sheets

(56) References Cited

U.S. PATENT DOCUMENTS

2021/0072489 A1* 3/2021 Iwamoto .............. G02B 7/08
2021/0203851 A1* 7/2021 Fujisaki ............... G03B 17/17

* cited by examiner

OPTICAL ELEMENT DRIVING MECHANISM

CROSS REFERENCE TO RELATED APPLICATIONS

This application claims the benefit of U.S. Provisional Application No. 63/056,183, filed Jul. 24, 2020, the entirety of which is incorporated by reference herein.

BACKGROUND OF THE INVENTION

Field of the Invention

The present disclosure relates to an optical element driving mechanism, and more particularly to an optical element driving mechanism using electromagnetic driving forces and resilient elements.

Description of the Related Art

As technology has developed, it has become more common to include image-capturing and video-recording functions into many types of modern electronic devices, such as notebooks computers, smartphones, and digital cameras. These electronic devices are used more and more often, and new models have been developed that are convenient, thin, and lightweight, offering more choices for consumers.

Electronic devices that have image-capturing or video-recording functions normally include one or more lenses, thereby performing such functions as auto focus (AF), zooming, and optical image stabilization (OIS). However, the trend in modern mobile devices is to have a higher image quality within limited volumes. As a result, the present disclosure provides an optical system different from the prior ones, to increase its optic quality and also achieve miniaturization.

BRIEF SUMMARY OF THE INVENTION

An optical element driving mechanism is provided in the present disclosure. The optical element driving mechanism includes a fixed portion and a movable portion. The movable portion moves relative to the fixed portion. The movable portion includes a first movable assembly and a second movable assembly. The first movable assembly is connected to a first optical element. The second movable assembly is connected to a second optical element. The first movable assembly and the second movable assembly are movable relative to each other.

In some embodiments of the present disclosure, the movable portion further includes a first coil and a second coil. The first coil is disposed at the first movable assembly. The second coil is disposed at the second movable assembly. The fixed portion includes a first magnetic element. The first magnetic element corresponds to the first coil, generating a first driving force. The first magnetic element corresponds to the second coil, generating a second driving force. The first magnetic element has a first surface facing the first coil and the second coil. The greatest length of the first coil is different from the greatest length of the second coil when viewed in a direction parallel to the first surface. In some embodiments, the first coil faces the second coil.

In some embodiments of the present disclosure, the fixed portion further includes a second magnetic element. The second magnetic element corresponds to the first coil, generating the first driving force. The second magnetic element corresponds to the second coil, generating the second driving force. The second magnetic element has a second surface facing the first coil and the second coil. The first surface is parallel to the second surface.

In some embodiments of the present disclosure, the fixed portion further includes a first guiding element and a second guiding element. The first guiding element has a first axis, guiding the first movable assembly and the second movable assembly to move in a first dimension. The second guiding element has a second axis, guiding the first movable assembly and the second movable assembly to move in the first dimension. A line connecting the first axis and the second axis intersects the first optical element when viewed along an optical axis of the first optical element. The fixed portion has a polygonal structure when viewed along the optical axis, and the first guiding element and the second guiding element are located at opposite corners of the fixed portion.

In some embodiments of the present disclosure, the first movable assembly further includes a first through hole and a first recess. The first guiding element is located in the first through hole. The second guiding element is located in the first recess. The second movable assembly further includes a second through hole and a second recess. The first guiding element is located in the second through hole. The second guiding element is located in the second recess. The first recess and the second recess are recessed from the same direction.

In some embodiments of the present disclosure, the first through hole and the second through hole have enclosed structures, and the first recess and the second recess have open structures. The second guiding element located in the first recess and the second recess is exposed from the first recess and the second recess.

In some embodiments of the present disclosure, the first through hole includes two openings separated apart. The openings completely overlap when viewed along the optical axis.

In some embodiments of the present disclosure, the first guiding element and the second guiding element are made of metal and each includes an insulated layer. The insulated layers are disposed on the surfaces of the first guiding element and the second guiding element.

In some embodiments of the present disclosure, the line connecting the first axis and the second axis intersects the optical axis. In some embodiments, when viewed along the optical axis, the length of the line is greater than the length of the first coil or the length of the second coil in a direction that is perpendicular to the optical axis.

In some embodiments of the present disclosure, the fixed portion further includes a plurality of V-shaped structures corresponding to the first guiding element and the second guiding element. The first guiding element and the second guiding element are secured in the V-shaped structures.

In some embodiments of the present disclosure, the optical element driving mechanism further includes: a first resilient element, a second resilient element, a third resilient element, and a fourth resilient element. The first resilient element is electrically connected to the first movable assembly. The second resilient element is electrically connected to the second movable assembly. The third resilient element is electrically connected to the first movable assembly. The fourth resilient element is electrically connected to the second movable assembly.

In some embodiments of the present disclosure, the first guiding element passes through the first resilient element and the second resilient element, and the second guiding element passes through the third resilient element and the fourth resilient element.

In some embodiments of the present disclosure, the first resilient element and the third resilient element each has an end electrically connected to the first coil, and another end connected to the fixed portion. The second resilient element and the fourth resilient element each has an end electrically connected to the second coil, and another end connected to the fixed portion.

In some embodiments of the present disclosure, the fixed portion further includes a first fixed assembly and a second fixed assembly. The first fixed assembly is connected to a third optical element. The second fixed assembly is connected to a fourth optical element. The first movable assembly and the second movable assembly are disposed between the first fixed assembly and the second fixed assembly. The first movable assembly and the second movable assembly are respectively movable relative to the first fixed assembly and the second fixed assembly.

In some embodiments of the present disclosure, the first fixed assembly includes a refractive element and a first container. The refractive element corresponds to the third optical element. The first container contains the refractive element and the third optical element. The second fixed assembly includes a second container containing the fourth optical element. In some embodiments, the fourth optical element extends beyond the second container.

In some embodiments of the present disclosure, the first movable assembly further includes a first holder and a first sensing magnetic element. The first holder holds the first optical element. The first sensing magnetic element is disposed on a surface of the first holder. The second movable assembly further includes a second holder and a second sensing magnetic element. The second holder holds the second optical element. The second sensing magnetic element is disposed on a surface of the second holder. The first sensing magnetic element and the second sensing magnetic element face the same direction.

In some embodiments of the present disclosure, the first holder includes one or more bumps disposed on the side of the first holder that faces the second holder.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
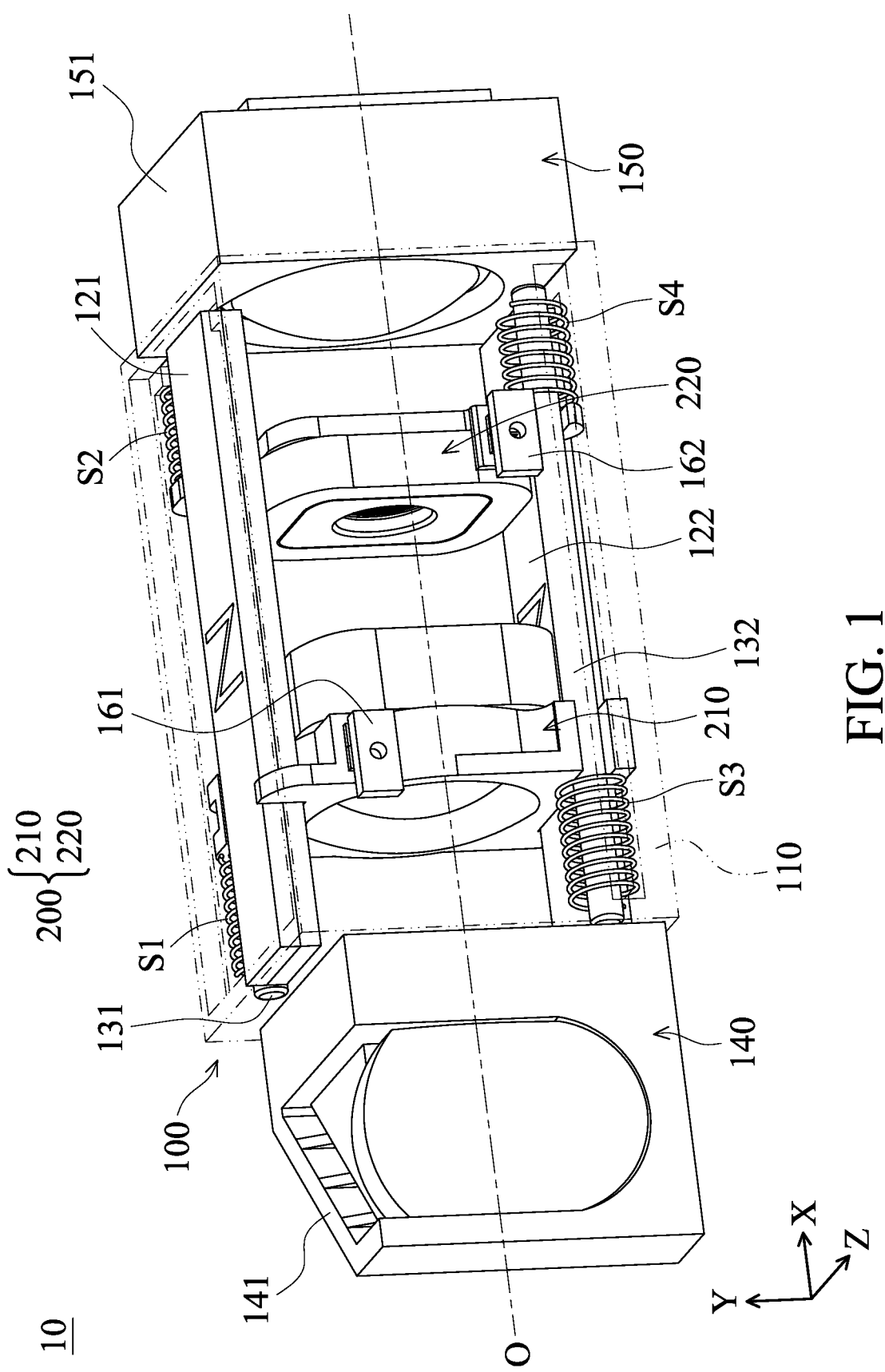
FIG. 1 is a perspective view of an optical element driving mechanism, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical element driving mechanism is provided in the present disclosure. Electromagnetic forces are generated by the disposed magnetic element with the coils connected to optical elements. The electromagnetic forces serve as driving forces for driving the optical elements to move along the direction of the optical axis reciprocally. In addition, the optical element driving mechanism may further include a plurality of resilient elements. Other than providing elastic restoring forces to the moving optical elements, the resilient elements may also be electrically connected to the coils of the optical elements for providing electric currents or delivering control signals.

First, referring to FIG. 1, FIG. 1 is a perspective view of an optical element driving mechanism 10, according to some embodiments of the present disclosure. In the embodiment shown in FIG. 1, the optical element driving mechanism 10 includes a fixed portion 100, a movable portion 200, a first resilient element S1, a second resilient element S2, a third resilient element S3, and a fourth resilient element S4. The fixed portion 100 includes a housing 110, a first guiding element 131, and a second guiding element 132. The first guiding element 131, the second guiding element 132, and the movable portion 200 are placed in the housing 110. The movable portion 200 is connected to the fixed portion 100 via the first resilient element S1, the second resilient element S2, the third resilient element S3, and the fourth resilient element S4. The movable portion 200 is movable relative to the fixed portion 100. The movable portion 200 includes a first movable assembly 210 and a second movable assembly 220. In some embodiments, the first movable assembly 210 and the second movable assembly 220 are movable relative to each other.

In some embodiments according to the present disclosure, the fixed portion 100 further includes a first fixed assembly 140 and a second fixed assembly 150, arranged along an optical axis O with the movable portion 200. In some embodiments, the movable portion 200 is disposed between the first fixed assembly 140 and the second fixed assembly 150. In the embodiment shown in FIG. 1, the optical axis O is parallel to the X direction. The movable portion 200 is movable relative to the fixed portion 100 along the optical axis O. Specifically, the movable portion 200 is movable relative to the first fixed assembly 140 and the second fixed assembly 150 along the optical axis O. More particularly, the first movable assembly 210 and the second movable assembly 220 of the movable portion 200 are independently movable relative to the first fixed assembly 140 and the second fixed assembly 150. The detailed structures of the first fixed assembly 140 and the second fixed assembly 150 will be described in subsequent paragraphs.

Figure 2:
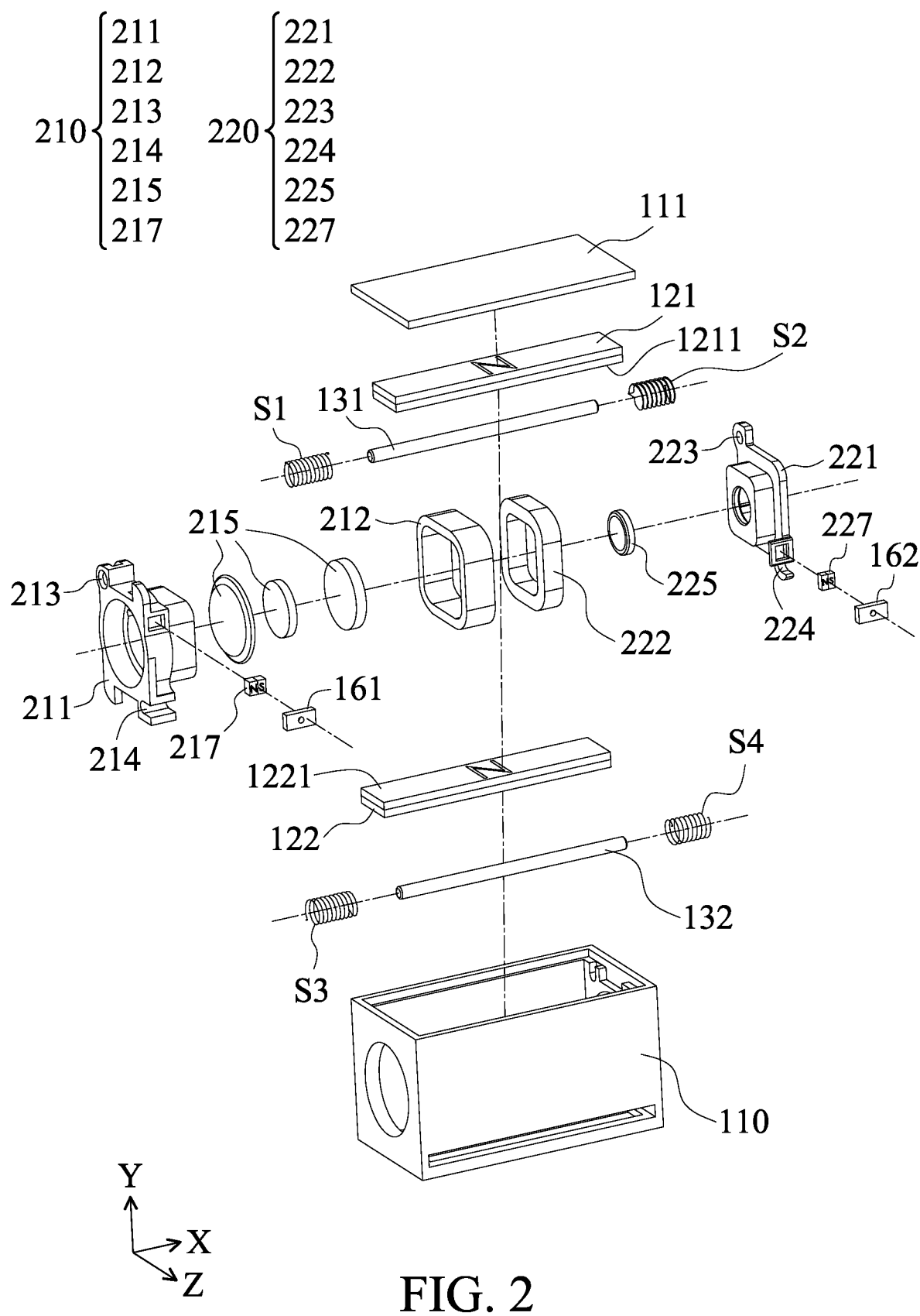
FIG. 2 is an exploded view of the optical element driving mechanism, according to some embodiments of the present disclosure, wherein the first fixed assembly and the second fixed assembly are omitted.

Referring to FIGS. 1 and 2, FIG. 2 is an exploded view of the optical element driving mechanism 10, according to some embodiments of the present disclosure, wherein the first fixed assembly 140 and the second fixed assembly 150 are omitted. As shown in FIGS. 1 and 2, the fixed portion 100 further includes a first magnetic element 121 and a second magnetic element 122, disposed on two opposite sides inside the housing 110. The first movable assembly 210 may include a first holder 211, a first coil 212, and a first optical element 215. The first holder 211 holds the first optical element 215. The first coil 212 encircles the first holder 211 on the outside. Similarly, the second movable assembly 220 may include a second holder 221, a second coil 222, and a second optical element 225. The second holder 221 holds the second optical element 225. The second coil 222 encircles the second holder 221 on the outside. The first magnetic element 121 of the fixed portion 100 has a first surface 1211 facing the first coil 212 and the second coil 222. The second magnetic element 122 has a second surface 1221 facing the first coil 212 and the second coil 222 as well. The first surface 1211 is parallel to the second surface 1221. In the embodiment shown in FIG. 2, the first surface 1211 is the S pole of the first magnetic element 121, and the second surface 1221 is the N pole of the second magnetic element 122. Of course, in other embodiments, the first surface 1211 may be the N pole of the first magnetic element 121, and the second surface 1221 may be the S pole of the second magnetic element 122. In some embodiments according to the present disclosure, the first magnetic element 121 corresponds to the first coil 212, generating a first driving force for moving the first movable assembly 210; the first magnetic element 121 corresponds to the second coil 222, generating a second driving force for moving the second movable assembly 220. Similarly, the second magnetic element 122 corresponds to the first coil 212, generating a first driving force for moving the first movable assembly 210; the second magnetic element 122 corresponds to the second coil 222, generating a second driving force for moving the second movable assembly 220. As a result, the first movable assembly 210 and the second movable assembly 220 may be subjected to the driving forces generated from the first magnetic element 121 and the second magnetic element 122, improving the driving efficiency and stability.

In some embodiments, the first magnetic element 121 and the second magnetic element 122 may be secured, such as by adhesives, on the sidewalls of the housing 110. For example, in the embodiment shown in FIG. 1, the first magnetic element 121 is secured on the upper sidewall of the housing 110, and the second magnetic element 122 is secured on the lower sidewall of the housing 110. It should be noted that, in some embodiments, the fixed portion 100 may only include one magnetic element for miniaturization or specific requirements of spatial configuration, and is still able to provide driving forces for the first movable assembly 210 and the second movable assembly 220. In some other embodiments, the fixed portion 100 may include three or four magnetic elements disposed on different sides of the housing 110, increasing the driving forces even more. In the embodiments where the fixed portion 100 includes multiple magnetic elements, these magnetic elements are configured symmetrical with respect to the optical axis O, providing balanced driving forces for the first movable assembly 210 and the second movable assembly 220.

It should be noted that, in the embodiments of the present disclosure, the movable portion 200 is a moving-coil type of design. That is, coils are connected to the movable portion 200, such that the coils are movable relative to the magnetic element(s) connected to the fixed portion 100. In a moving-magnet type of design, where magnetic elements are connected to the movable portion 200 and the coils are connected to the fixed portion 100, every movable assembly requires one corresponding coil to be disposed. Instead, in the moving-coil type of design, multiple coils connected to a plurality of movable assemblies may share the same magnetic element, allowing users to control the moving directions of the first movable assembly 210 and the second movable assembly 220 simply by alternating the current input into the coils. This is advantageous to overall miniaturization of the mechanism and lowers the complexity of control.

In some particular embodiments, the first movable assembly 210 is an optical assembly for optical zooming, and the second movable assembly 220 is an optical assembly for auto focus (AF). The first optical element 215 in the first movable assembly 210 and the second optical element 225 in the second movable assembly 220 may be lenses. The amounts and shapes of the first optical element 215 and the second optical element 225 may be selected based on actual optical requirements.

The first movable assembly 210 is connected to the first guiding element 131 and the second guiding element 132, so as to move in a first dimension. In the embodiment shown in the figures of the present disclosure, the first dimension indicates a translational movement in X direction. Similarly, the second movable assembly 220 is also connected to the first guiding element 131 and the second guiding element 132, so as to move in the first dimension. When viewed along the optical axis O, the first guiding element 131 and the second guiding element 132 may be respectively located in opposite corners of the fixed portion 100. For example, in the embodiment shown in FIG. 1, the housing 110 of the fixed portion 100 has a rectangular structure. When viewed from the right side (such as from the angle shown in FIG. 7), the first guiding element 131 is located closer to the upper right corner of the rectangle, and the second guiding element 132 is located closer to the lower left corner of the rectangle. In some other embodiments, the housing 110 of the fixed portion 100 may have other polygonal structures while the first guiding element 131 and the second guiding element 132 are located in any suitable position inside the housing 110.

Figure 3:
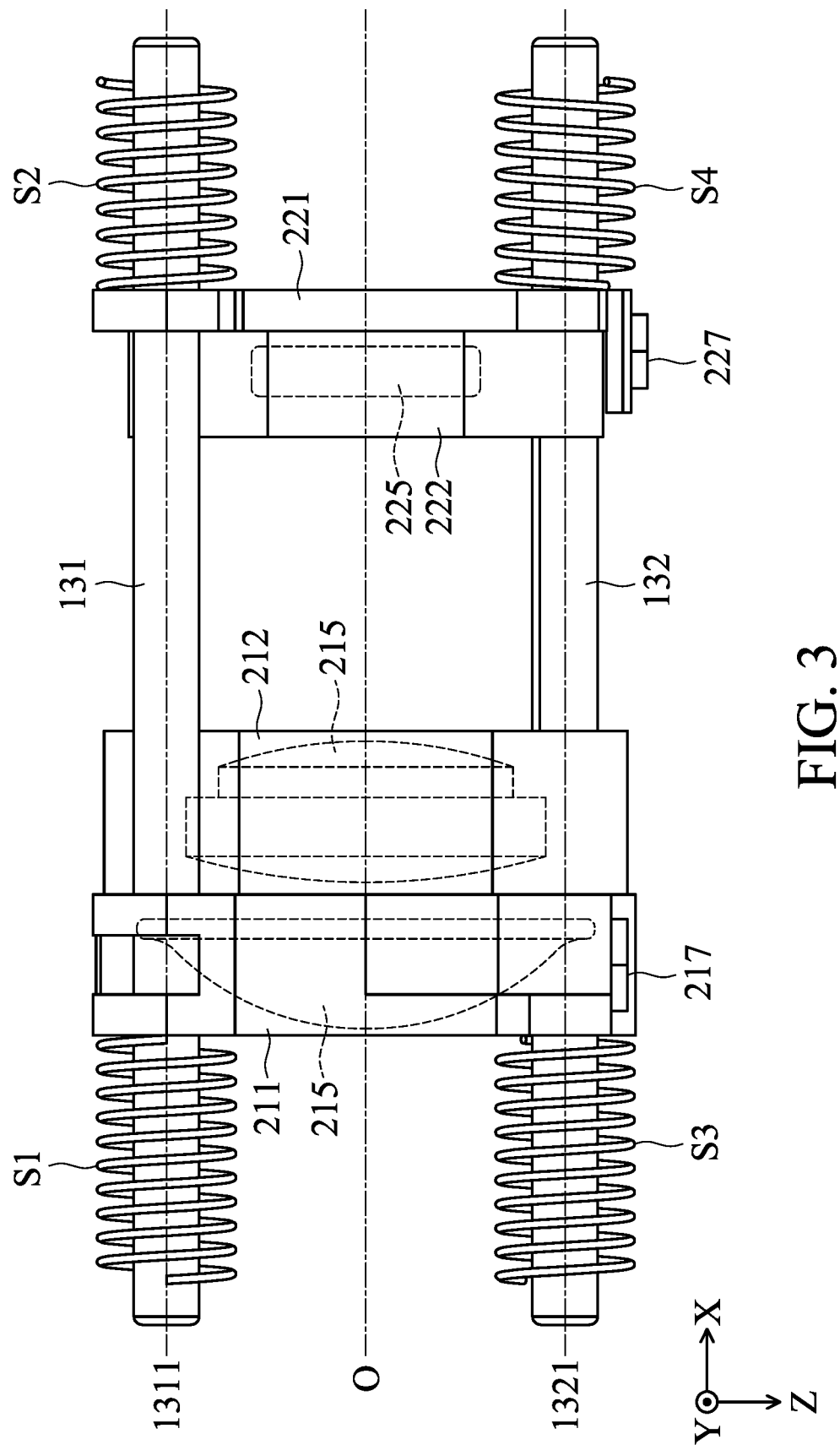
FIG. 3 is a top view of a portion of the optical element driving mechanism, according to some embodiments of the present disclosure.

Referring to FIG. 3, FIG. 3 is a top view of a portion of the optical element driving mechanism 10, according to some embodiments of the present disclosure. As shown in FIG. 3, the first guiding element 131 passes through the first resilient element S1 and the second resilient element S2, and the second guiding element 132 passes through the third resilient element S3 and the fourth resilient element S4. The first resilient element S1 and the third resilient element S3 each has an end that is electrically connected to the first coil 212, and another end that is connected to the fixed portion 100 (the fixed portion 100 is not shown in FIG. 3). As mentioned above, the first resilient element S1 and the third resilient element S3 may provide elastic restoring forces when the first movable assembly 210 moves, and provide electric currents and/or delivering control signals to the first coil 212. Similarly, the second resilient element S2 and the fourth resilient element S4 each has an end that is electrically connected to the second coil 222, and another end that is connected to the fixed portion 100. The second resilient element S2 and the fourth resilient element S4 may provide elastic restoring forces when the second movable assembly 220 moves, and provide electric currents and/or delivering control signals to the second coil 222. In some embodiments, the first resilient element S1 and the third resilient element S3 that are connected to the first coil 212 serve as an input end and an output end of the electric current provided for the first coil 212, respectively. Similarly, the second resilient element S2 and the fourth resilient element S4 that are connected to the second coil 222 serve as an input end and an output end of the electric current provided for the second coil 222, respectively. The input ends and the output ends may be exchanged.

In the embodiment shown in FIG. 3, the first holder 211 of the first movable assembly 210 holds a plurality of (e.g. three) first optical elements 215. The amount of the first optical elements 215 may be determined by the user based on the desired optical effect. For example, one, two, four or more first optical elements 215 may be included. The amount of the first optical elements 215 shown in the figures is not intended to be limiting. Similarly, the second holder 221 of the second movable assembly 220 may hold one or more second optical elements 225. The amount of the second optical elements 225 shown in the figures is not intended to be limiting. In addition, the structures or shapes of the first holder 211 and the second holder 221 may be determined based on the amounts and sizes of the optical elements held therein. The structures or shapes of the first holder 211 and the second holder 221 shown in the figures are not intended to be limiting.

Figure 7:
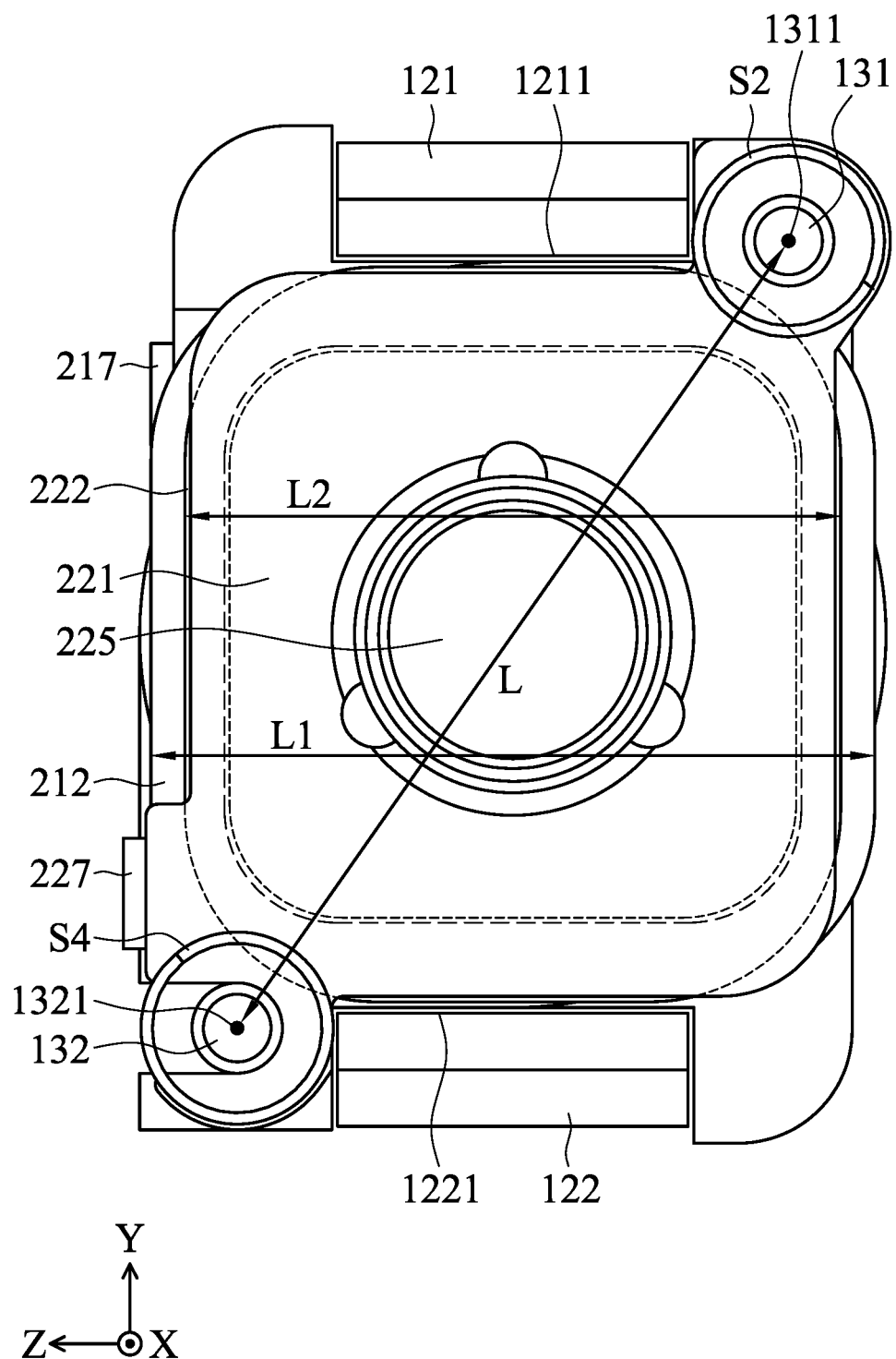
FIG. 7 is a right side view of a portion of the optical element driving mechanism, according to some embodiments of the present disclosure.
Figure 8:
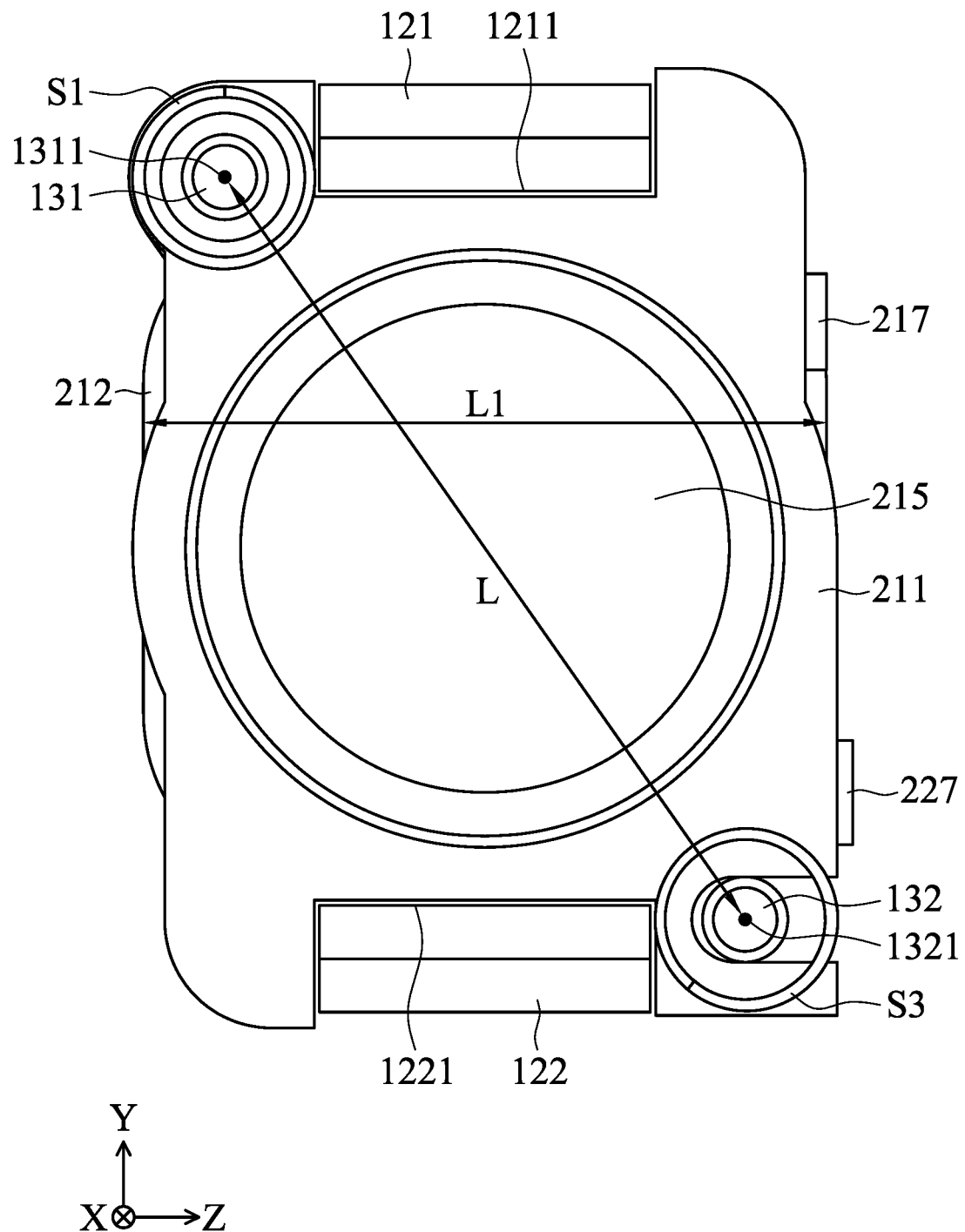
FIG. 8 is a left side view of the portion of the optical element driving mechanism shown in FIG. 7, according to some embodiments of the present disclosure.

As shown in FIG. 3, the first guiding element 131 has a first axis 1311, and the second guiding element 132 has a second axis 1321. The first axis 1311 and the second axis 1321 are parallel to the optical axis O that passes through the first optical element 215 and the second optical element 225. A line L may be formed by connecting the first axis 1311 and the second axis 1321 in a direction that is perpendicular to the optical axis O, as shown in FIGS. 7 and 8. The line L may intersect the first optical element 215. In some embodiments, the line L may intersect the optical axis O.

Figure 4:
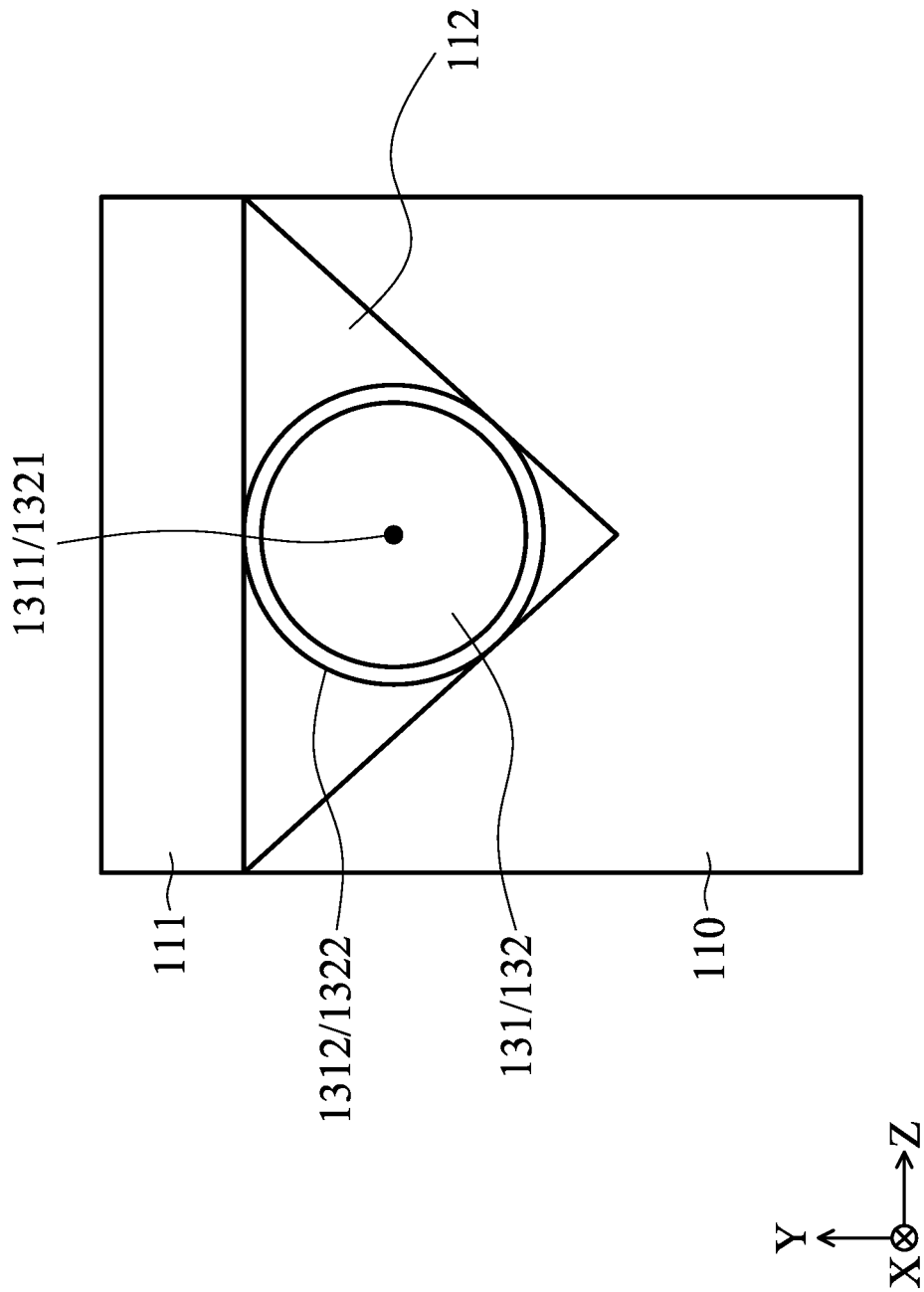
FIG. 4 is a schematic view of the V-shaped structure inside the housing, according to some embodiments of the present disclosure.

Referring to FIG. 4, FIG. 4 is a schematic view of the V-shaped structure 112 inside the housing 110, according to some embodiments of the present disclosure. In some embodiments, the housing 110 of the fixed portion 100 may include a cover 111 and a plurality of (e.g. four) V-shaped structures 112. Each of the plurality of V-shaped structures 112 corresponds to the ends of the first guiding element 131 and the second guiding element 132 that are connected to the fixed portion 100. During the assembling process, the first guiding element 131 or the second guiding element 132 may be placed inside the V-shaped structure 112 before the cover 111 is covered thereon. As such, the first guiding element 131 or the second guiding element 132 may be fixed inside the triangular space of the V-shaped structure 112. Additionally, since the edges of the first guiding element 131 or the second guiding element 132 may be tangent to two sides of the V-shaped structure 112 and to the cover 111, the movement of the first guiding element 131 or the second guiding element 132 in Y direction or Z direction may be restricted. Once the purpose of security is achieved, the first axis 1311 of the first guiding element 131 or the second axis 1321 of the second guiding element 132 may be placed in any desired locations.

In some embodiments, each of the first guiding element 131 and the second guiding element 132 may be made of metal (e.g. stainless steel), providing desired structural strength. In some embodiments, the first guiding element 131 includes an insulated layer 1312 that is disposed on the surface of the first guiding element 131, and the second guiding element 132 includes an insulated layer 1322 that is disposed on the surface of the second guiding element 132. The disposal of the insulated layer 1312 may prevent the first guiding element 131 from electrically interfering the first resilient element S1 and the second resilient element S2 connected thereto. Similarly, the disposal of the insulated layer 1322 may prevent the second guiding element 132 from electrically interfering the third resilient element S3 and the fourth resilient element S4 connected thereto.

Figure 5:
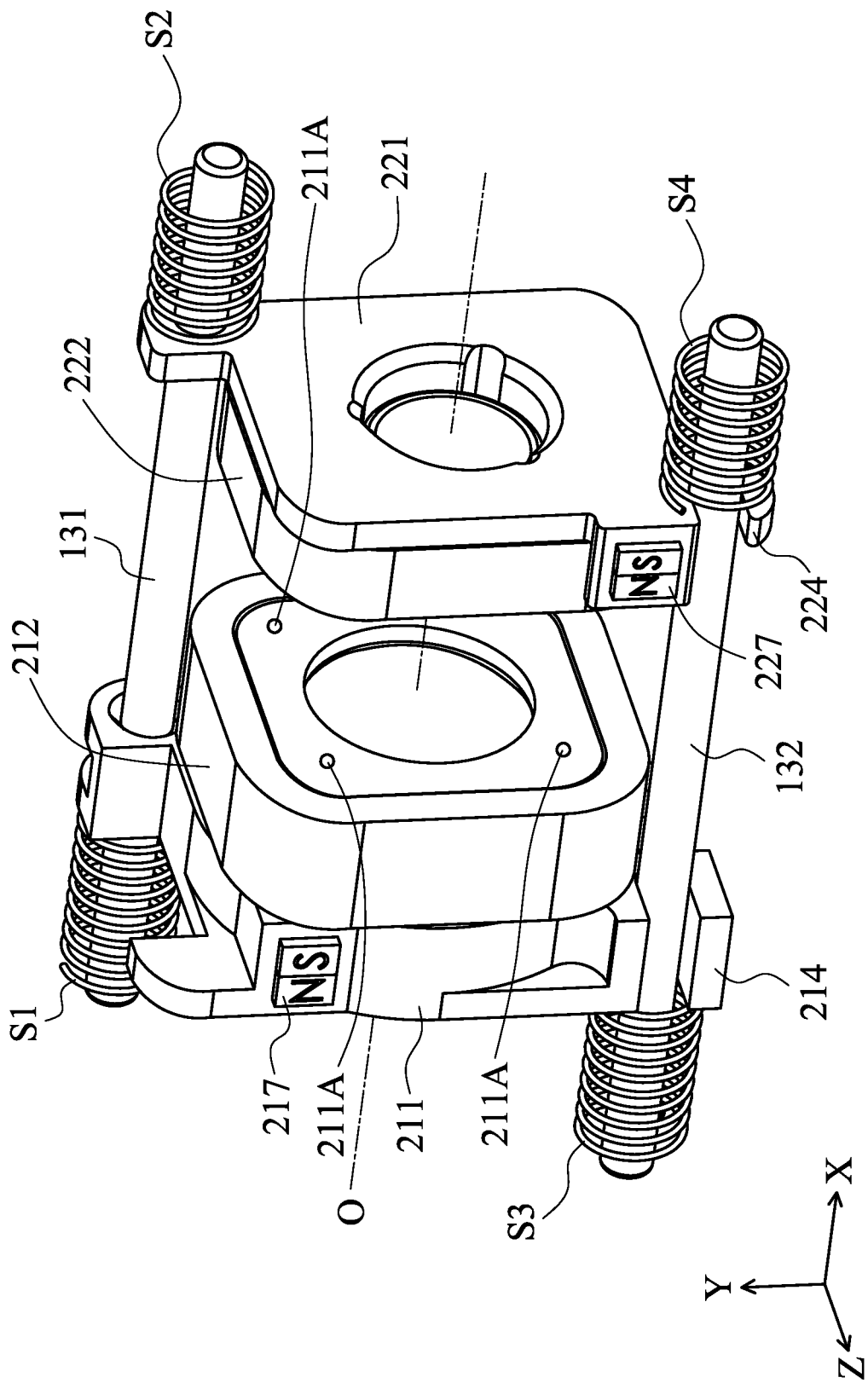
FIG. 5 is a perspective view of a portion of the optical element driving mechanism, according to some embodiments of the present disclosure.
Figure 6:
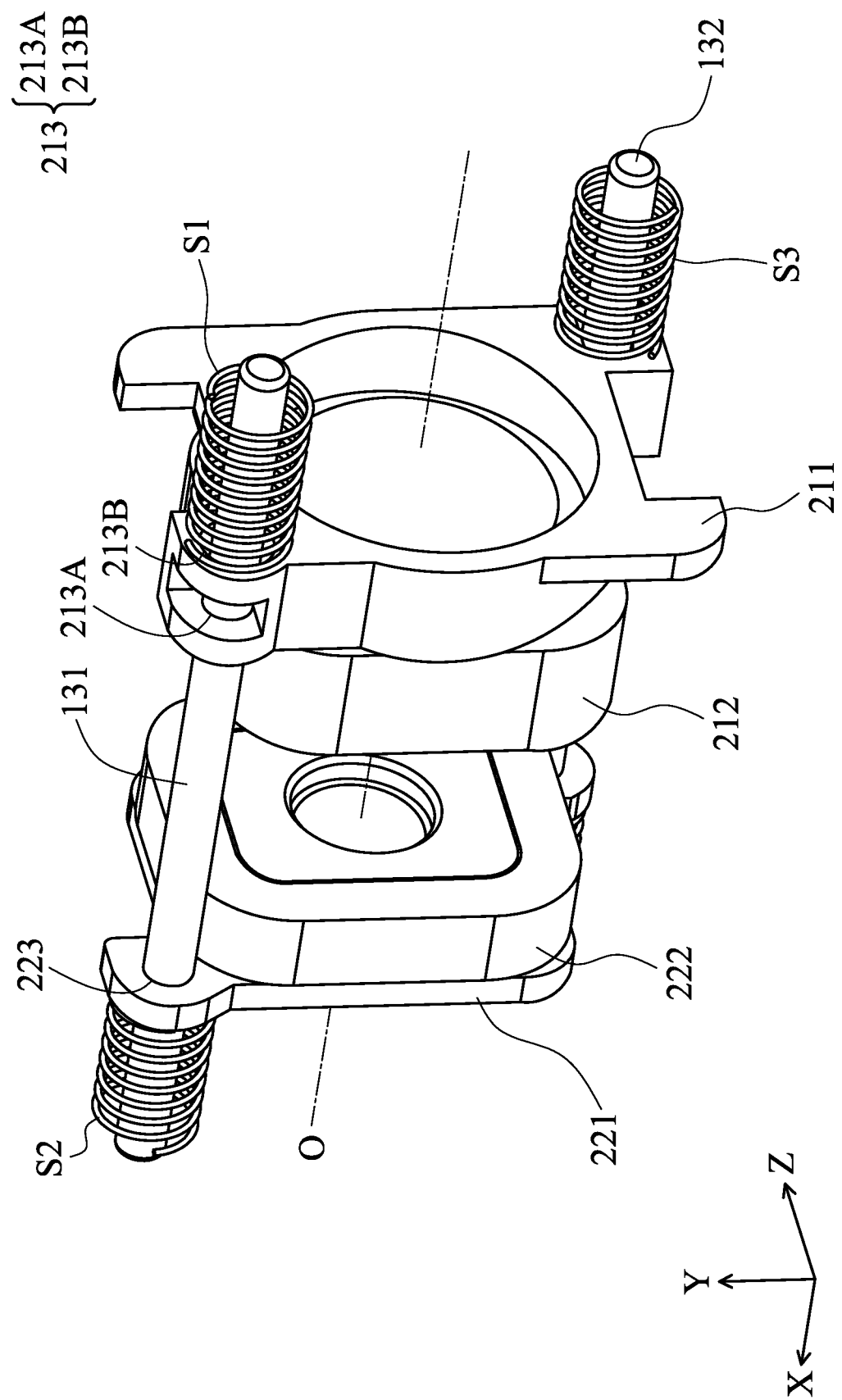
FIG. 6 is a perspective view of the portion of the optical element driving mechanism shown in FIG. 5 from another view angle, according to some embodiments of the present disclosure.

Next, referring to FIGS. 5 and 6, FIG. 5 is a perspective view of a portion of the optical element driving mechanism 10, according to some embodiments of the present disclosure. FIG. 6 is a perspective view of the portion of the optical element driving mechanism 10 shown in FIG. 5 from another view angle, according to some embodiments of the present disclosure. As shown in the figures, the first movable assembly 210 further includes a first through hole 213 with an enclosed structure and a first recess 214 with an open structure. The first guiding element 131 is located in the first through hole 213, and the second guiding element 132 is located in the first recess 214. Similarly, the second movable assembly 220 further includes a second through hole 223 with an enclosed structure and a second recess 224 with an open structure. The first guiding element 131 is located in the second through hole 223, and the second guiding element 132 is located in the second recess 224.

In the embodiment shown in FIG. 5, the first recess 214 and the second recess 224 are recessed from the same direction. Specifically, the open ends of the open structures of the first recess 214 and the second recess 224 face the same direction (e.g. positive Z direction), so that the second guiding element 132 located in the first recess 214 and the second recess 224 may be exposed from the open ends.

During the assembling process, this is advantageous for placing the second guiding element 132, allowing larger size tolerances.

In the embodiment shown in FIG. 6, the first through hole 213 includes two openings 213A and 213B that are separated apart. Both the openings 213A and 213B have enclosed structures. When viewed along the optical axis O, the openings 213A and 213B completely overlap. In some embodiments where the first holder 211 has a greater thickness (in X direction), the size of the holes would not be affected by the manufacturing process, which may result in different diameters of the holes, through adapting separated openings 213A and 213B. By reducing the thickness of the openings 213A and 213B in X direction, the first guiding element 131 is ensured to pass through the first through hole 213 smoothly. Of course, the second through hole 223 may also be modified to multiple openings based on design requirements.

During the assembling process, the first guiding element 131 may be passed through the enclosed first through hole 213 and second through hole 223 at first. Using the V-shaped structure 112 as mentioned with respect to FIG. 4, the parallelism of the first axis 1311 of the first guiding element 131 may be obtained. At this moment, the first movable assembly 210 and the second movable assembly 220 are suspended onto the first guiding element 131, which may lead to rotational movements due to the moment of gravity. Accordingly, the first recess 214 and the second recess 224 may be fit onto the second guiding element 132. Since both of the open ends of the first recess 214 and the second recess 224 face sideways (e.g. positive Z direction), providing stopper structures in the direction of gravity for the first movable assembly 210 and the second movable assembly 220, the rotating of the first movable assembly 210 and the second movable assembly 220 may be prevented. In addition, since both of the first recess 214 and the second recess 224 have open structures, the assembling of the entire mechanism would not be affected even if the parallelism between the first guiding element 131 and the second guiding element 132 is not perfect.

In the embodiment shown in FIG. 5, the first holder 211 of the first movable assembly 210 includes one or more bumps 211A (e.g. one, three, or four etc.). The bumps 211A are disposed on the side of the first holder 211 facing the second holder 221, preventing the first optical element 215 and the second optical element 225 that are inside the first holder 211 and the second holder 221 from colliding with each other when the first holder 211 and the second holder 221 moves relative to each other. Of course, the bumps may also be disposed on the side of the second holder 221 facing the first holder 211. This choice may be made based on actual needs. Additionally, the shapes of the first holder 211 and/or the second holder 221 may also be modified to ensure that the first optical element 215 and the second optical element 225 would not collide. For example, structures that serve as stoppers may be disposed on the first holder 211 and/or the second holder 221.

It should be noted that, in some other embodiments, one or more additional optical modules (not shown) may be disposed between the first movable assembly 210 and the second movable assembly 220. For example, the additional optical module may be a group of lenses that consists of one or more optical elements, a shutter, or an aperture, etc. In some embodiments, the additional optical module may be fixed to the fixed portion 100 while the first movable assembly 210 and the second movable assembly 220 are movable relative to the additional optical module. In some other embodiments, the additional optical module may be similar to the first movable assembly 210 and the second movable assembly 220. A coil may be disposed on the additional optical module, and driving forces for the additional optical module may be generated from the first magnetic element 121 and the second magnetic element 122. The additional optical module may be guided by the first guiding element 131 and the second guiding element 132 to move in the first dimension. This disposal may meet various different requirements of users for the optical element driving mechanism 10.

As shown in FIG. 5, in some embodiments, the first movable assembly 210 further includes a first magnetic element 217 disposed on the surface of the first holder 211. The second movable assembly 220 further includes a second magnetic element 227 disposed on the surface of the second holder 221. The positions of the first magnetic element 217 and the second magnetic element 227 may be adjusted based on actual needs, thus the configurations shown in the figures are not intended to be limiting. The first magnetic element 217 corresponds to the first sensing element 161 disposed on the fixed portion 100, and the second magnetic element 227 corresponds to the second sensing element 162 disposed on the fixed portion 100 (see FIGS. 1 and 2). In some embodiments according to the present disclosure, the first sensing element 161 and the second sensing element 162 are disposed on the same sidewall of the housing 110 of the fixed portion 100. Therefore, both the first magnetic element 217 and the second magnetic element 227 face the same side. It should be understood that the positions of the first sensing element 161 and the second sensing element 162 may be adjusted based on actual needs, thus the configurations shown in the figures are not intended to be limiting. The first magnetic element 217 and the second magnetic element 227 are used for sensing the positions of the first movable assembly 210 and the second movable assembly 220 when they move relative to the fixed portion 100, whereby control signals may be used for achieving the optical zooming and/or auto focusing effects. In some particular embodiments, the first sensing element 161 and the second sensing element 162 may be Tunneling Magnetoresistance Effect Sensors (TMR Sensors) or Giant Magnetoresistance Effect Sensors (GMR Sensors).

Next, referring to FIGS. 7 and 8, FIG. 7 is a right side view of a portion of the optical element driving mechanism 10, according to some embodiments of the present disclosure. FIG. 8 is a left side view of the portion of the optical element driving mechanism 10 shown in FIG. 7, according to some embodiments of the present disclosure. As shown in the figures, when viewed along X direction (i.e. the direction parallel to the first surface 1211), the greatest length L1 of the first coil 212 in Z direction is different from the greatest length L2 of the second coil 222 in Z direction. The length L1 is greater than the length L2. In addition, the length L1 of the first coil 212 does not extend beyond the greatest width of the first holder 211 in Z direction and/or Y direction. Similarly, the length L2 of the second coil 222 does not extend beyond the greatest width of the second holder 221 in Z direction and/or Y direction. As such, the first coil 212 and the second coil 222 may be prevented from scraping against other components during movements, thereby avoiding unnecessary interference.

In some embodiments according to the present disclosure, the first coil 212 faces the second coil 222. Specifically, the first coil 212 is located on the side of the first movable assembly 210 that is closer to positive X direction, and the second coil 222 is located on the side of the second movable assembly 220 that is closer to negative X direction. This is because in some embodiments according to the present disclosure, out of the multiple optical elements inside the movable portion 200, those with smaller diameters are usually arranged in the center region of the movable portion 200. To prevent the lengths of the first coil 212 and the second coil 222 from being too long and to meet the requirement of miniaturization, the first coil 212 and the second coil 222 are disposed on the sides of the first holder 211 and the second holder 221 that have smaller diameters. Of course, as long as the first coil 212 and the second coil 222 would not scrape against other components, the first coil 212 and the second coil 222 may be located based on actual needs.

When viewed along the optical axis O (in X direction), the length of the line L connecting the first axis 1311 of the first guiding element 131 and the second axis 1321 and the second guiding element 132 is greater than the length L1 of the first coil 212 and the length L2 of the second coil 222. It should be noted that the length L may be as long as possible. As mentioned above, the first recess 214 and the second recess 224 through which the second guiding element 132 passes may prevent the rotational movements of the first movable assembly 210 and the second movable assembly 220 caused by moment of gravity. In cases where the line L is longer, the resistance forces provided by the stoppers in the first recess 214 and the second recess 224 may be smaller. This reduces the requirements for dimensional accuracy, and also improves the mechanism stability. In some embodiments, the first guiding element 131 and the second guiding element 132 may be disposed in two corners inside the housing 110 with the greatest distance therebetween. For example, the first guiding element 131 and the second guiding element 132 may be disposed in the upper right corner and the lower left corner when viewed at the angle in FIG. 7 to achieve the advantages mentioned above.

Figure 9:
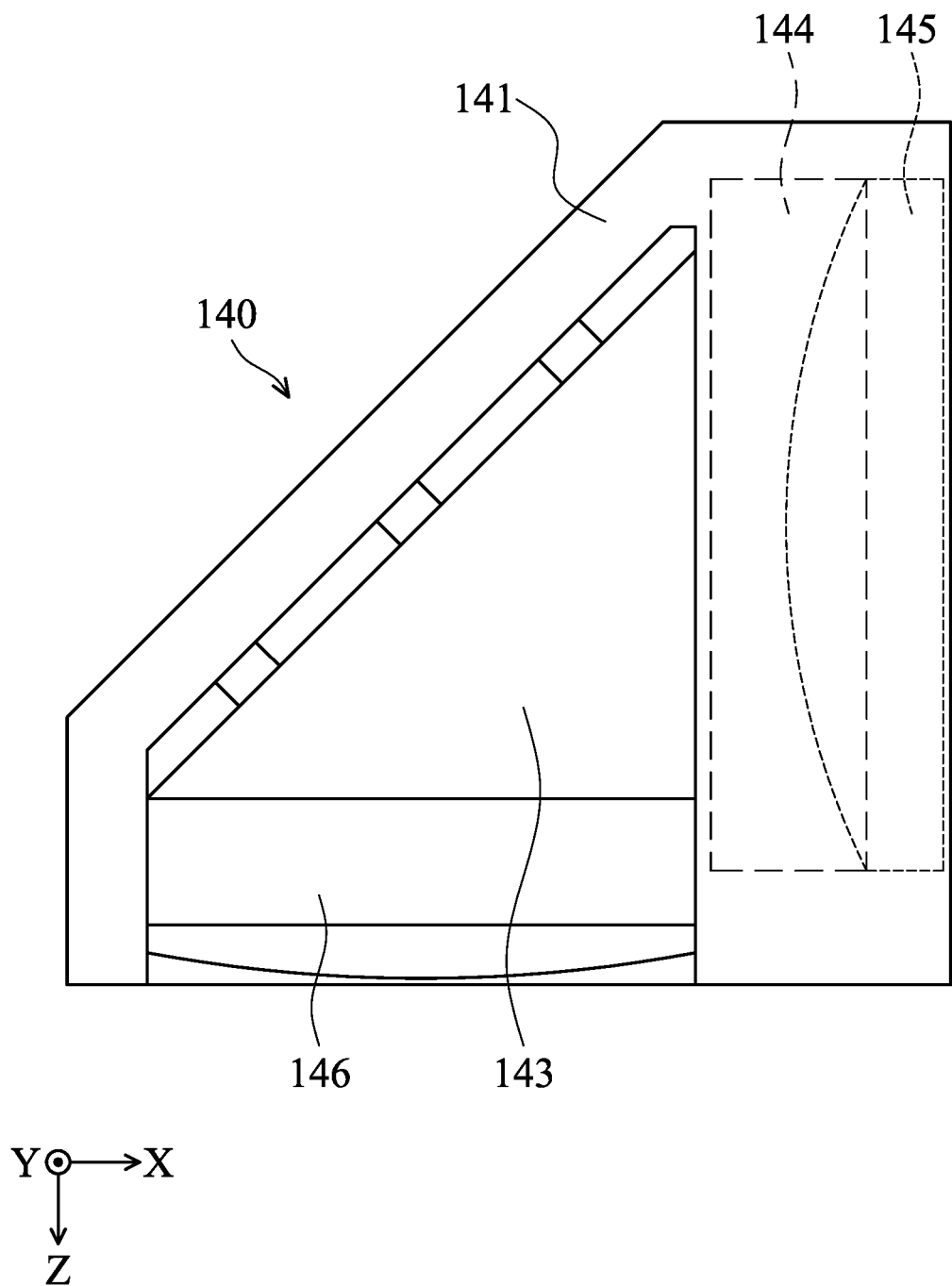
FIG. 9 is a top view of the first fixed assembly, according to some embodiments of the present disclosure.

FIG. 9 is a top view of the first fixed assembly 140, according to some embodiments of the present disclosure. The first fixed assembly 140 and the movable portion 200 are arranged along the direction of the optical axis O. The first fixed assembly 140 includes a first container 141, a refractive element 143, a third holder 144 and a third optical element 145. The refractive element 143, the third holder 144, and the third optical element 145 are accommodated in the first container 141 that is disposed on the side of the movable portion 200 closer to the light incident end. The refractive element 143 may be used for changing the direction of the incident light. For example, the incident light coming from Z direction may be refracted, and the traveling direction of the light is changed into X direction. The light then enters the third optical element 145 and the optical elements of the movable portion 200 in X direction. The third optical element 145 may be held by the third holder 144 that is disposed on the side of the refractive element 143 facing the movable portion 200. The third optical element 145 may be used for converging/diverging the light after the refraction. The converged/diverged light then enters the movable portion 200. In some embodiments, the first fixed assembly 140 may further include a fifth optical element 146 that is accommodated in the first container 141. The fifth optical element 146 may be disposed on the side of the refractive element 143 facing the light incident end. The fifth optical element 146 may be used for collecting rays of light. For example, rays of light coming from various directions may be collected and focused by the fifth optical element 146 before entering the refractive element 143.

Figure 10:
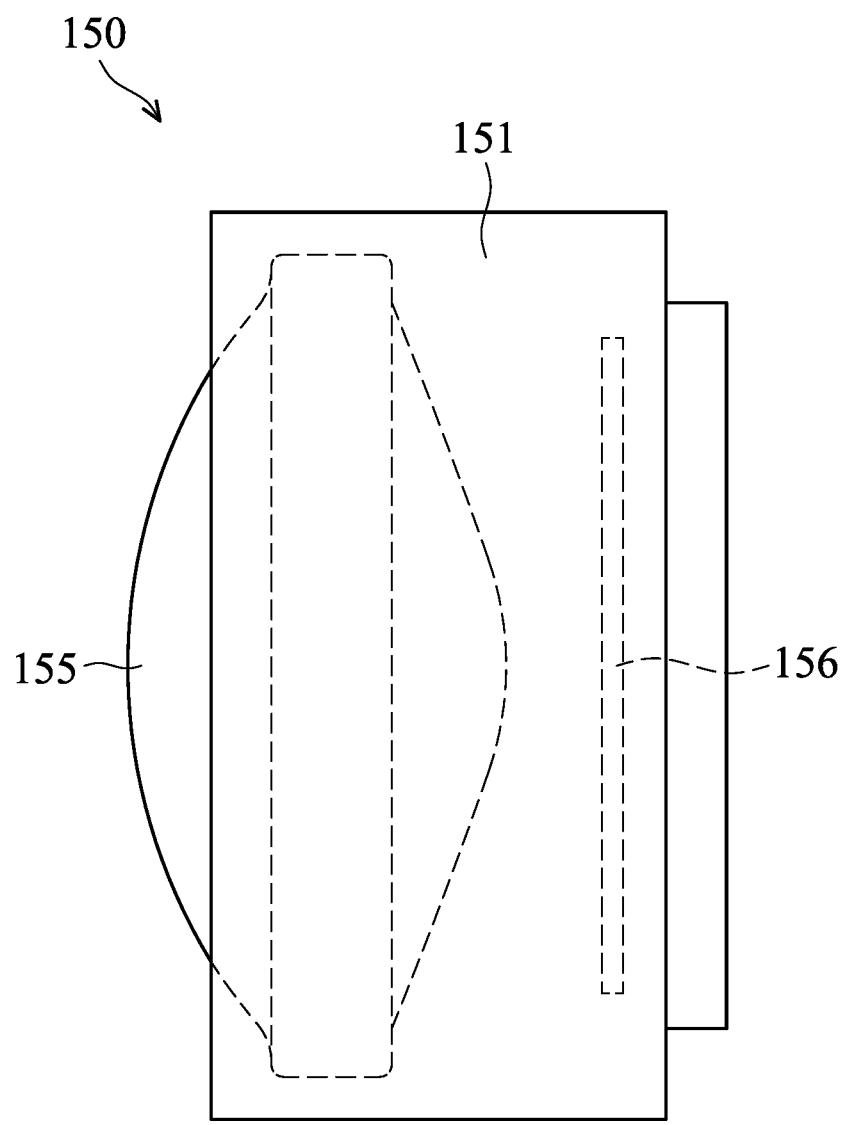
FIG. 10 is a top view of the second fixed assembly, according to some embodiments of the present disclosure.

FIG. 10 is a top view of the second fixed assembly 150, according to some embodiments of the present disclosure. The second fixed assembly 150 and the movable portion 200 are arranged along the direction of the optical axis O. The second fixed assembly 150 includes a second container 151 and a fourth optical element 155. The fourth optical element 155 is accommodated in the second container 151 that is disposed on the side of the movable portion 200 closer to the light emitting end. In some embodiments, the fourth optical element 155 may extend beyond the second container 151 for optical design requirements. However, the protruding fourth optical element 155 is prevented from colliding with other optical elements by structural designs of the second container 151 and the housing 110. In some embodiments, the second fixed assembly 150 may further include a sixth optical element 156 that is accommodated in the second container 151. The sixth optical element 156 may be disposed on the side that is closer to the light emitting end than the fourth optical element 155. In some embodiments, the optical element driving mechanism 10 may be connected to an external optical sensing assembly (not shown) that is arranged on the side of the light emitting end of the second fixed assembly 150. The optical sensing assembly may be used for receiving the light passing through the optical element driving mechanism 10.

It should be noted that the amount of optical elements included in the first fixed assembly 140 and the second fixed assembly 150 is not limited to the amount illustrated in the present disclosure. Users may install any suitable amount of optical elements inside the first fixed assembly 140 and/or the second fixed assembly 150 based on actual needs. The structures or shapes of the first container 141 and/or the second container 151 may be adjusted accordingly.

In summary, the optical element driving mechanism 10 of the present disclosure may achieve miniaturization by utilizing the moving-coil type of design, so that the first movable assembly 210 and the second movable assembly 220 share the first magnetic element 121 and the second magnetic element 122. By disposing the first resilient element S1, the second resilient element S2, the third resilient element S3, the fourth resilient element S4, and the first guiding element 131 and the second guiding element 132, the first movable assembly 210 and the second movable assembly 220 are allowed to move reciprocally along the optical axis O in a stable way. This is effective for achieving optical zooming and optical focus. Equipped with the optical elements in the first fixed assembly 140 and the second fixed assembly 150, desired optical quality may be obtained, and the application of the optical element driving mechanism 10 may be more variable. Therefore, the present disclosure provides an optical element driving mechanism 10 that may achieve miniaturization, high optic quality and high applicability.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion, movable relative to the fixed portion, wherein the movable portion includes:
a first movable assembly connected to a first optical element; and
a second movable assembly connected to a second optical element;
wherein the first movable assembly is movable relative to the second movable assembly;
wherein the movable portion further comprises:
a first coil disposed at the first movable assembly; and
a second coil disposed at the second movable assembly;
wherein the fixed portion comprises:
a first magnetic element, wherein the first magnetic element only has a single magnet, which corresponds to the first coil and generates a first driving force, wherein the first magnetic element also corresponds to the second coil and generates a second driving force, wherein the magnet of the first magnetic element has a first surface facing the first coil and the second coil;
wherein the greatest length of the first coil is different from the greatest length of the second coil when viewed in a direction parallel to the first surface.

2. The optical element driving mechanism as claimed in claim 1, wherein the first coil faces the second coil.

3. The optical element driving mechanism as claimed in claim 1, wherein the fixed portion further comprises:
a second magnetic element, corresponding to the first coil and generating the first driving force, corresponding to the second coil and generating the second driving force, wherein the second magnetic element has a second surface facing the first coil and the second coil, and the first surface is parallel to the second surface.

4. The optical element driving mechanism as claimed in claim 1, wherein the fixed portion further comprises:
a first guiding element with a first axis, guiding the first movable assembly and the second movable assembly to move in a first dimension; and
a second guiding element with a second axis, guiding the first movable assembly and the second movable assembly to move in the first dimension;
wherein a line connecting the first axis and the second axis intersects the first optical element when viewed along an optical axis of the first optical element;
wherein the fixed portion has a polygonal structure when viewed along the optical axis, and the first guiding element and the second guiding element are located at opposite corners of the fixed portion.

5. The optical element driving mechanism as claimed in claim 4, wherein the first movable assembly further comprises:
a first through hole, in which the first guiding element is located; and
a first recess, in which the second guiding element is located;
wherein the second movable assembly further comprises:
a second through hole, in which the first guiding element is located; and
a second recess, in which the second guiding element is located;
wherein the first recess and the second recess are recessed from the same direction.

6. The optical element driving mechanism as claimed in claim 5, wherein the first through hole and the second through hole have enclosed structures, and the first recess and the second recess have open structures, wherein the second guiding element, that is located in the first recess and the second recess, is exposed from the first recess and the second recess.

7. The optical element driving mechanism as claimed in claim 5, wherein the first through hole includes two openings separated apart, and the openings completely overlap when viewed along the optical axis.

8. The optical element driving mechanism as claimed in claim 4, wherein the first guiding element and the second guiding element are made of metal and each includes an insulated layer that is disposed on the surface of the first guiding element or of the second guiding element.

9. The optical element driving mechanism as claimed in claim 4, wherein the line connecting the first axis and the second axis intersects the optical axis.

10. The optical element driving mechanism as claimed in claim 9, wherein when viewed along the optical axis, the length of the line is greater than the length of the first coil or the length of the second coil in a direction that is perpendicular to the optical axis.

11. The optical element driving mechanism as claimed in claim 4, wherein the fixed portion further comprises a plurality of V-shaped structures corresponding to the first guiding element and the second guiding element, and the first guiding element and the second guiding element are secured in the V-shaped structures.

12. The optical element driving mechanism as claimed in claim 4, further comprising:
a first resilient element electrically connected to the first movable assembly;
a second resilient element electrically connected to the second movable assembly;
a third resilient element electrically connected to the first movable assembly; and
a fourth resilient element electrically connected to the second movable assembly.

13. The optical element driving mechanism as claimed in claim 12, wherein the first guiding element passes through the first resilient element and the second resilient element, and the second guiding element passes through the third resilient element and the fourth resilient element.

14. The optical element driving mechanism as claimed in claim 13, wherein the first resilient element and the third resilient element each has an end electrically connected to the first coil, and another end connected to the fixed portion;
wherein the second resilient element and the fourth resilient element each has an end electrically connected to the second coil, and another end connected to the fixed portion.

15. The optical element driving mechanism as claimed in claim 1, wherein the fixed portion further comprises:
a first fixed assembly connected to a third optical element; and
a second fixed assembly connected to a fourth optical element;
wherein the first movable assembly and the second movable assembly are disposed between the first fixed assembly and the second fixed assembly, and the first movable assembly and the second movable assembly are respectively movable relative to the first fixed assembly and the second fixed assembly.

16. The optical element driving mechanism as claimed in claim 15, wherein the first fixed assembly comprises:
   a refractive element corresponding to the third optical element; and
   a first container containing the refractive element and the third optical element;
   wherein the second fixed assembly comprises:
   a second container containing the fourth optical element.

17. The optical element driving mechanism as claimed in claim 16, wherein the fourth optical element extends beyond the second container.

18. The optical element driving mechanism as claimed in claim 1, wherein the first movable assembly further comprises:
   a first holder holding the first optical element; and
   a first sensing magnetic element disposed on a surface of the first holder;
   wherein the second movable assembly further comprises:
   a second holder holding the second optical element; and
   a second sensing magnetic element disposed on a surface of the second holder;
   wherein the first sensing magnetic element and the second sensing magnetic element face the same direction.

19. The optical element driving mechanism as claimed in claim 18, wherein the first holder includes one or more bumps disposed on the side of the first holder that faces the second holder.

* * * * *